(12) United States Patent
Sheng et al.

(10) Patent No.: US 9,520,121 B2
(45) Date of Patent: Dec. 13, 2016

(54) ACOUSTIC AND VIBRATIONAL ENERGY ABSORPTION METAMATERIALS

(71) Applicant: THE HONG KONG UNIVERSITY OF SCIENCE AND TECHNOLOGY, Hong Kong (CN)

(72) Inventors: Ping Sheng, Hong Kong (CN); Zhiyu Yang, Hong Kong (CN); Min Yang, Hong Kong (CN); Liang Sun, Hong Kong (CN); Guancong Ma, Hong Kong (CN); Songwen Xiao, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 14/892,213

(22) PCT Filed: May 27, 2014

(86) PCT No.: PCT/CN2014/078529
§ 371 (c)(1),
(2) Date: Nov. 19, 2015

(87) PCT Pub. No.: WO2014/206168
PCT Pub. Date: Dec. 31, 2014

(65) Prior Publication Data
US 2016/0104472 A1    Apr. 14, 2016

Related U.S. Application Data

(60) Provisional application No. 61/964,635, filed on Jan. 10, 2014, provisional application No. 61/871,995, (Continued)

(51) Int. Cl.
*G10K 11/172* (2006.01)
*E04B 1/86* (2006.01)
(Continued)

(52) U.S. Cl.
CPC .............. *G10K 11/172* (2013.01); *B32B 3/08* (2013.01); *B32B 3/28* (2013.01); *G10K 11/168* (2013.01);
(Continued)

(58) Field of Classification Search
CPC ............................. G10K 11/172; E04B 1/86
(Continued)

(56) References Cited

U.S. PATENT DOCUMENTS 8,616,330 B1 * 12/2013 McKnight .............. G10K 11/16
181/207
8,695,753 B2 * 4/2014 Goossens ................ H04R 7/14
181/166
(Continued)

FOREIGN PATENT DOCUMENTS

CN          1664920 A        9/2005
GB       2 292 786 A        3/1996
WO     2012/151472 A2     11/2012

OTHER PUBLICATIONS

ISR issued in international application No. PCT/CN2014/078529 mailed Sep. 2, 2014.

*Primary Examiner* — Forrest M Phillips
(74) *Attorney, Agent, or Firm* — Nath, Goldberg & Meyer; Jerald L. Meyer; Stanley Protigal

(57) ABSTRACT

A substantially acoustically transparent planar, rigid frame divided into a plurality of individual, substantially two-dimensional cells is used to construct a sound absorption panel. A sheet of a flexible material is fixed to the rigid frame, and a plurality of platelets fixed to the sheet of flexible material such that each cell is provided with a respective platelet, thereby establishing a resonant frequency, establishing an increase in an absorption coefficient of the panel. The flexible material has a wrinkle or corrugation to permit distortion with reduced material elasticity.

(Continued)

The wrinkle or corrugation permits the flexible material to distort beyond that afforded by a planar material of the same type, while retaining mechanical strength in supporting the plurality of platelets.

26 Claims, 13 Drawing Sheets

Related U.S. Application Data filed on Aug. 30, 2013, provisional application No. 61/957,122, filed on Jun. 25, 2013.

(51) Int. Cl.
*B32B 3/08* (2006.01)
*B32B 3/28* (2006.01)
*G10K 11/168* (2006.01)
*G10K 11/20* (2006.01)

(52) U.S. Cl.
CPC ............ *G10K 11/20* (2013.01); *B32B 2255/10* (2013.01); *B32B 2255/205* (2013.01); *B32B 2307/102* (2013.01); *B32B 2307/546* (2013.01); *B32B 2419/00* (2013.01); *B32B 2605/00* (2013.01); *B32B 2607/00* (2013.01)

(58) Field of Classification Search
USPC .......................................................... 181/288
See application file for complete search history.

(56) References Cited

U.S. PATENT DOCUMENTS

| 8,752,667 | B2 * | 6/2014 | McKnight | G10K 11/172 181/207 |
| 8,857,563 | B1 * | 10/2014 | Chang | H03H 9/25 181/286 |
| 8,857,564 | B2 * | 10/2014 | Ma | G10K 11/18 181/284 |
| 8,997,923 | B2 * | 4/2015 | Ichihashi | B32B 3/10 181/292 |
| 2013/0133979 | A1 * | 5/2013 | Sheng | G10K 11/172 181/294 |
| 2014/0060962 | A1 | 3/2014 | Sheng et al. | |

* cited by examiner

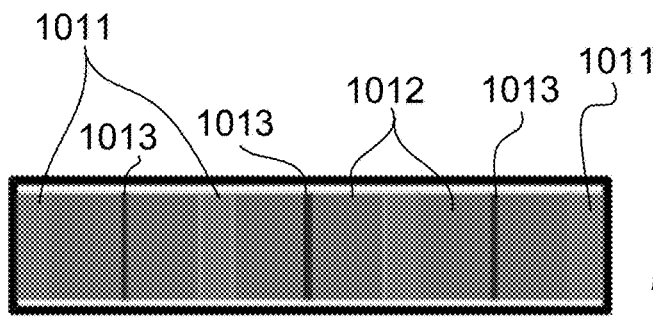
*Fig. 10A*
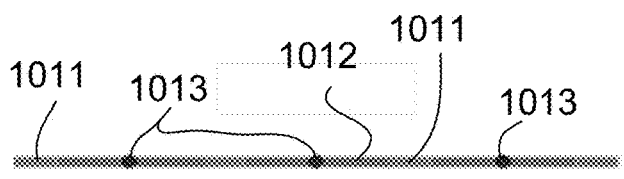
*Fig. 10B*
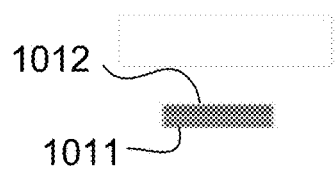
*Fig. 10C*
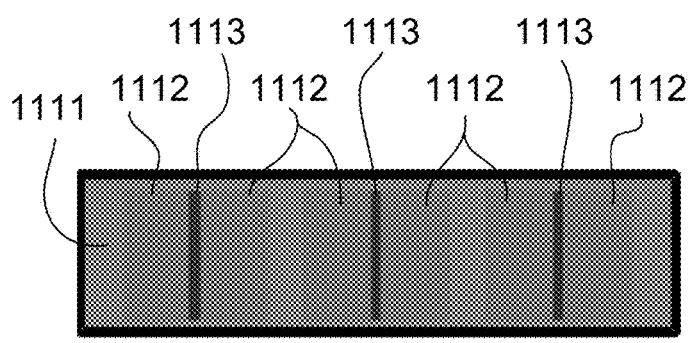
*Fig. 11A*
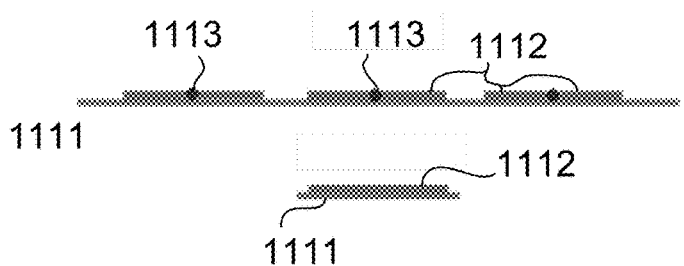
*Fig. 11B*
*Fig. 11C*

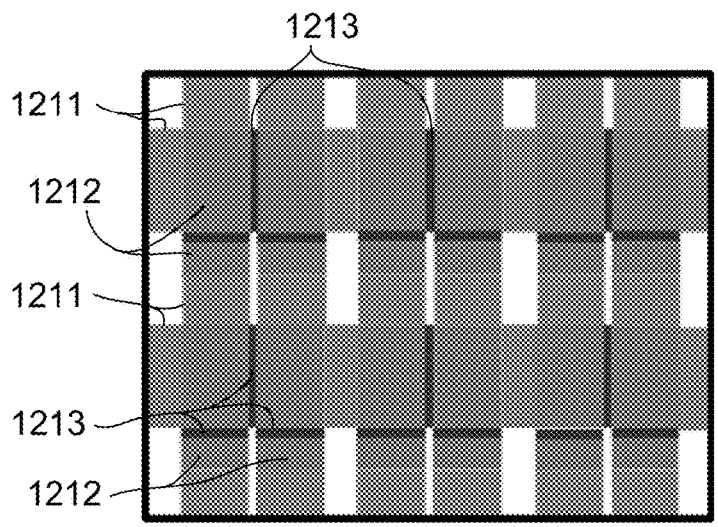
*Fig. 12A*
*Fig. 12B*
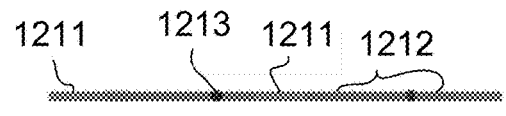
*Fig. 12C*
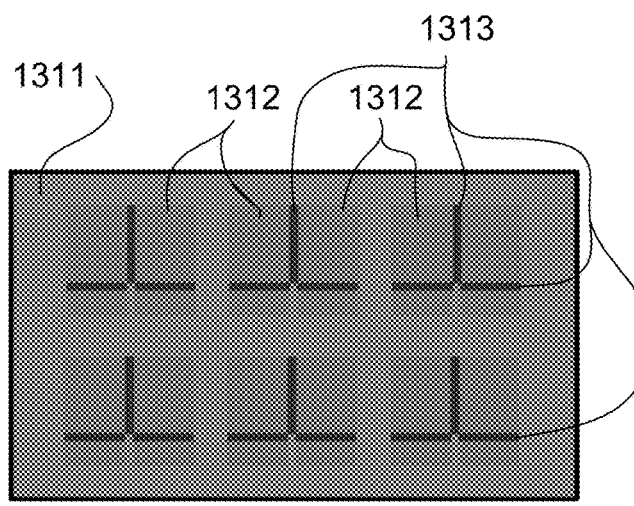
*Fig. 13A*
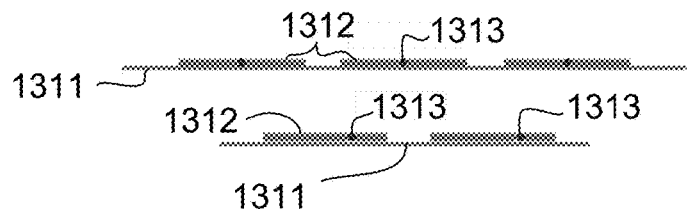
*Fig. 13B*
*Fig. 13C*

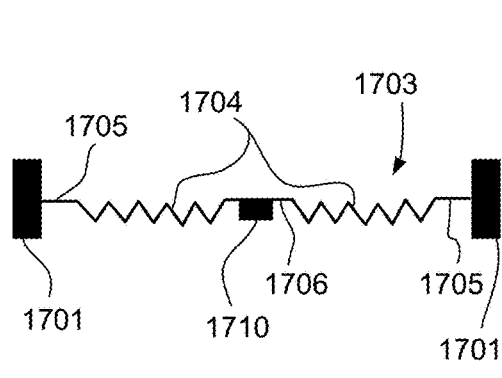
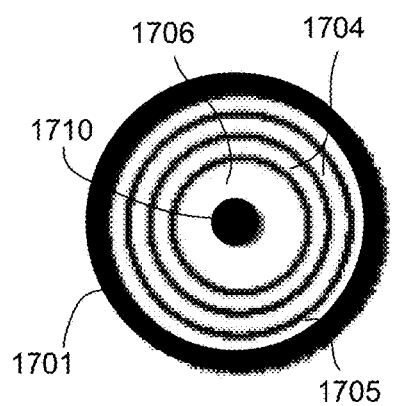
Fig. 17A        Fig. 17B
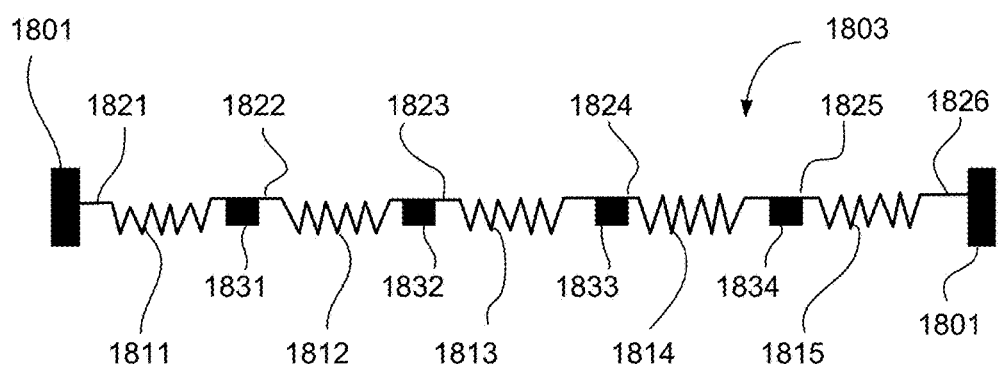
Fig. 18A
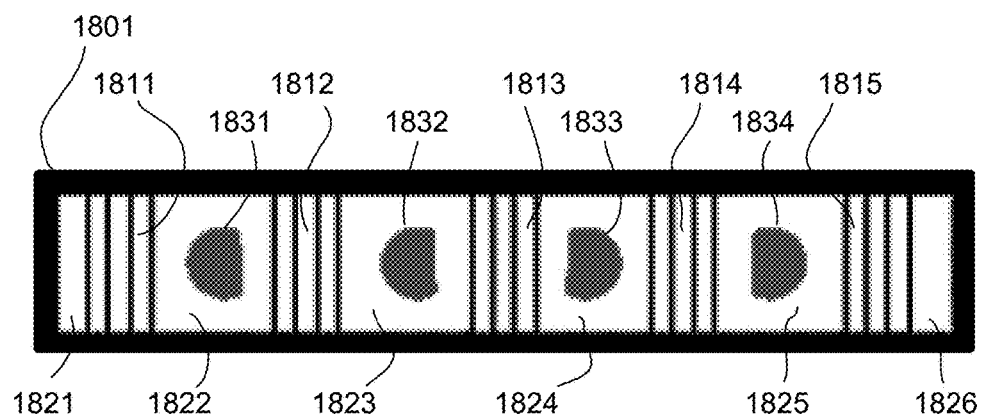
Fig. 18B

ACOUSTIC AND VIBRATIONAL ENERGY ABSORPTION METAMATERIALS

This is a National Phase Application filed under 35 U.S.C. 371 as a national stage of PCT/CN2014/078529 filed May 27, 2014, an application claiming the benefit under 35 USC 119(e) to the following U.S. Provisional Applications Nos. 61/964,635 filed Jan. 10, 2014, 61/871,995 filed Aug. 30, 2013, and 61/957,122 filed Jun. 25, 2013, the content of each of which is hereby incorporated by reference in its entirety.

BACKGROUND

Field

The present disclosure relates to an energy absorption material, and in particular to absorb sound energy and to provide a shield or sound barrier and sound absorption system useful even though the system is geometrically open.

Background

The attenuation of low frequency sound and vibration has been a challenging task because the dynamics of dissipative systems are generally governed by the rules of linear response, which dictate the frictional forces and fluxes to be both linearly proportional to rates. It follows that the dissipative power is quadratic in rates, thereby accounting for the inherently weak absorption of low frequency sound waves by homogeneous materials. To enhance the dissipation at low frequencies it is usually necessary to increase the energy density inside the relevant material, e.g., through resonance.

SUMMARY

A sound absorption panel is formed with a substantially acoustically transparent planar, rigid frame divided into a plurality of individual, substantially two dimensional cells. A sheet of a flexible material is fixed to the rigid frame, and a plurality of platelets are fixed to the sheet of flexible material. This results in a configuration in which each cell is provided with a respective platelet, thereby establishing a resonant frequency. The resonant frequency is defined by the planar geometry of the respective individual cells, the flexibility of the flexible material and said respective platelet thereon and establishing an increase in an absorption coefficient of the panel. The flexible material has a wrinkle or corrugation to permit distortion with reduced material elasticity. The wrinkle or corrugation permits the flexible material to distort beyond that afforded by a planar material of the same type, while retaining mechanical strength in supporting the plurality of platelets.

In an alternate configuration, an acoustic/vibrational energy absorption metamaterial has a flexible membrane attached to an enclosed planar frame, with one or more rigid platelets attached to the membrane. The platelets each have an asymmetric shape, with a substantially straight edge at the attachment to the membrane so that the rigid platelets establish cells with a predetermined mass. The rigid platelets are mounted to provide a restoring force exerting by the membrane upon displacement of the rigid platelet. Vibrational motions of the structure contain plural resonant modes with tunable resonant frequencies.

BRIEF DESCRIPTION OF THE DRAWINGS

The file of this patent contains at least one drawing executed in color. Copies of this patent with color drawing(s) will be provided by the Office upon request and payment of the necessary fee.

FIGS. 10A-10C are schematic representations of a first alternate metastructure, depicted as a side mount structure. FIG. 10A is a top view; FIG. 10B is a front view; and FIG. 10C is a side view.

FIGS. 11A and 11B is a schematic representation of a second alternate metastructure, depicted as a bottom mount structure. FIG. 11A is a top view; FIG. 11B is a front view; and FIG. 11C is a side view.

FIGS. 12A and 12B is a schematic representation of a third alternate metastructure, depicted as a side mount structure. FIG. 12A is a top view; FIG. 12B is a front view; and FIG. 12C is a side view.

FIGS. 13A and 13B is a schematic representation of a fourth alternate metastructure, depicted as a bottom mount structure. FIG. 13A is a top view; FIG. 13B is a front view; and FIG. 13C is a side view.

FIGS. 17A and 17B are schematic drawings of a sound attenuation structure with wrinkled membranes for sound blocking, using a single platelet per cell. FIG. 17A is a side view and FIG. 17B is a top or plan view.

FIGS. 18A and 18B are schematic drawings of sound attenuation structures with wrinkled membranes for sound blocking, in which multiple platelets are attached to a wrinkled or corrugated membrane. FIG. 18A is a side view and FIG. 18B is a top or plan view.

DETAILED DESCRIPTION

Overview

Figure 1A:
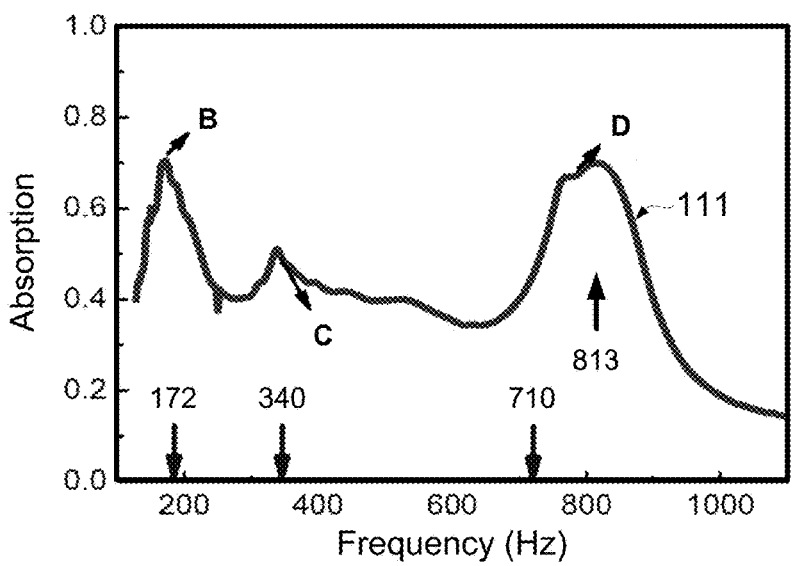
FIG. 1A is a graphical depiction of absorption properties of a unit cell.

The term "metamaterials" denotes the coupling to the incident wave to be resonant in character. In an open system, radiation coupling to resonance is an alternative that can be effective in reducing dissipation. While the advent of acoustic metamaterials has broadened the realm of possible material characteristics, as yet there are no specific resonant structures targeting the efficient and sub-wavelength absorption of low frequency sound. In contrast, various electromagnetic metamaterials designed for absorption have been proposed, and an "optical black hole" has been realized by using metamaterials to guide the incident wave into a lossy core.

It has been found that by using thin elastic membranes decorated with or augmented with designed patterns of rigid platelets, the resulting acoustic metamaterials can absorb 86% of the acoustic waves at ~170 Hz, with two layers absorbing 99% of the acoustic waves at the lowest frequency resonant modes, as well as at the higher frequency resonant modes. The sample is thus acoustically "dark" at those frequencies. Finite-element simulations of the resonant mode patterns and frequencies are in excellent agreement with the experiments. In particular, laser Doppler measurements of resonant modes' displacement show discontinuities in its slope around platelets' perimeters, implying significantly enhanced curvature energy to be concentrated in these small volumes that are minimally coupled to the radiation modes; thereby giving rise to strong absorption similar to a cavity system, even though the system is geometrically open.

It should be noted that the membrane-type metamaterials of the present subject matter differ from the previous works that were based on a different mechanism of anti-resonance occurring at a frequency that is in-between two eigenfrequencies, at which the structure is decoupled from the acoustic wave (and which also coincides with the diverging dynamic mass density), thereby giving rise to its strong reflection characteristics. Without coupling, there is naturally almost no absorption at the anti-resonance frequency. But even at the resonant eigenmode frequencies where the coupling is strong, the measured absorption is still low, owing to the strong coupling to the radiation mode that leads to high transmission. In contrast, for the dark acoustic metamaterials the high energy density regions couple minimally with the radiation modes, thereby leading to near-total absorption as in an open cavity.

In this arrangement, anti-resonances do not play any significant roles. The anti-resonances are essential in sound blocking, but are insignificant in sound absorption.

In devices including thin elastic membranes augmented with rigid plates or platelets, vibration energy can be highly concentrated on certain parts, such as the edges of the platelets, and dissipated to heat by the internal friction of the membranes. The devices can therefore effectively absorb the vibration energy passed onto it; i.e., acts like a vibration damper to elastic waves in solids. In both cases of airborne sound waves and elastic waves in solids, the vibration will excite the augmented membranes and the vibrational energy will be greatly dissipated by the devices. The working frequency range can be tailor-made by proper design of the devices so they can absorb the vibration from various sources under different situations. When such devices are attached to a solid host structure where damping of vibration is required, such as a beam, a plate (e.g., a car door or chassis), etc., vibration of the host structure is passed onto the frame, which can cause the resonances in the attached membrane devices, and dissipation of mechanical energy will occur. When they are installed in a chamber buried underground, for example, they can reduce the amplitude of the underground elastic waves that might be emitted from passing trains on the surface, or even seismic waves. Existing technology for vibration protection of a building requires the building to be sitting on a vibration isolator having massive steel-reinforced rubber pads and/or damped springs. The design and construction of isolator and building must be done together. The presently disclosed devices can be embedded underground around the existing buildings without modifying their foundation. A blocking belt can be constructed around the train station, for example, for the abatement of the vibrations from moving trains.

The vibration damping device in the present disclosure includes a grid of a two-dimensional array of cells fixed on a rigid frame. The main difference between this configuration and that of the configuration with thin elastic membranes augmented with rigid platelets lies in the use of frictional hinges to absorb the vibration energy. In one configuration, the device is essentially the same as the configuration with thin elastic membranes augmented with rigid platelets, except that a hard platelet is no longer required. Alternatively, the platelets are joined by frictional hinges. In either configuration, the elastic membrane can be mounted on the bottom of the platelets or mounted on the sides of the platelets.

Examples

Figure 1B:
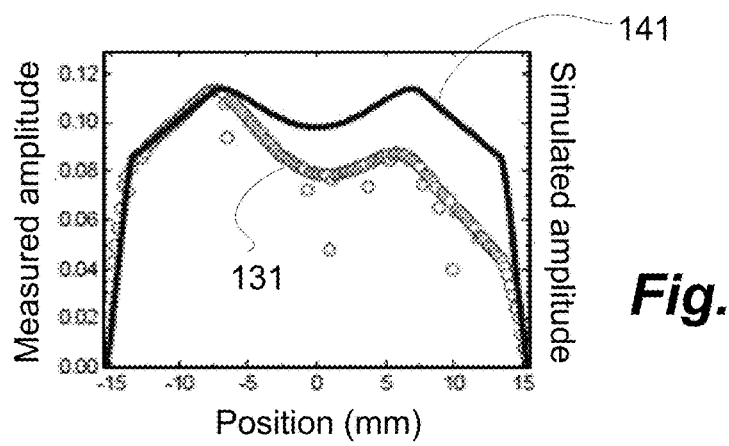
FIG. 1B is a graphical depiction of amplitude vs. position taken at 172 Hz. for the sample depicted in FIG. 1A.
Figure 1C:
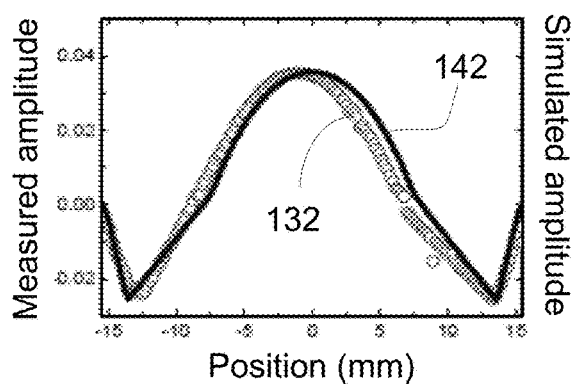
FIG. 1C is a graphical depiction of amplitude vs. position taken at 340 Hz. for the sample depicted in FIG. 1A.
Figure 1D:
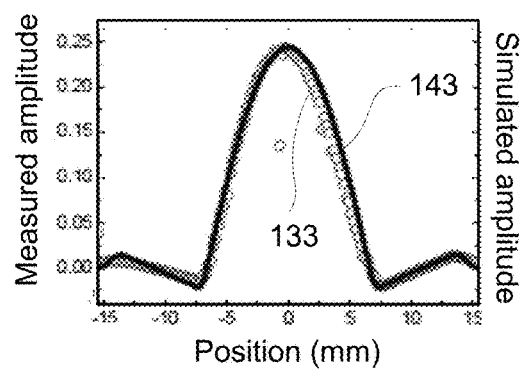
FIG. 1D is a graphical depiction of amplitude vs. position taken at 710 Hz. for the sample depicted in FIG. 1A.
Figure 1E:
FIG. 1E is a photo image of the sample unit cell described in the graphs of FIGS. 1A-1D

FIGS. 1A-1D are graphical depictions of sound absorption properties of a unit cell used in a cell array as shown in FIG. 1E. FIG. 1A is a graphical depiction of absorption properties of a unit cell as shown in FIG. 1E. In FIG. 1A, curve 111 denotes the measured absorption coefficient for Sample A. There are three absorption peaks located at 172, 340, and 813 Hz, indicated by the arrows at the abscissa along the bottom of the graph. The other arrows at 172, 340, and 710 Hz indicate the positions of the absorption peak frequencies predicted by finite-element simulations. The 813 Hz peak is the observed peak position obtained from experimental measurement appearing on curve 111 at "D". The arrow at 710 Hz indicates the theoretical peak position obtained by numerical calculation. Ideally the two values 710 Hz and 813 Hz should be the same, so the discrepancy indicates that the theoretical calculation is not an entirely accurate predictor of Sample A due to physical characteristics of the sample being modeled.

The unit cell of FIG. 1A comprises a rectangular elastic membrane that is 31 mm by 15 mm and 0.2 mm thick. The elastic membrane was fixed by a relatively rigid grid, decorated with or augmented with two semi-circular iron platelets with a radius of 6 mm and 1 mm in thickness. The iron platelets are purposely made to be asymmetrical so as to induce "flapping" motion, as seen below. This results in a relatively rigid grid that can be regarded as an enclosed planar frame within the order of tens of centimeters to tens of meters. Moreover, the iron platelets can be replaced with any other rigid or semi-rigid platelets with asymmetric shapes. The sample with this configuration is denoted Sample A, which in FIG. 1A is depicted in the xy plane, with the two platelets separated along the y axis. Acoustic waves are incident along the z direction. This simple cell is used to understand the relevant mechanism and to compare with theoretical predictions.

Three cross-sectional profiles, representing vibrational patterns across the structure, are depicted in FIGS. 1B, 1C and 1D. The cross-sectional profiles are taken in along a central line, at graph locations B, C and D of FIG. 1A, respectively. The cross-sectional profiles depicted in FIGS. 1B, 1C and 1D are of w along the x axis of the unit cell. The straight sections (7.5 mm≤|x|≤13.5 mm) of the profile indicate the positions of the platelets, which may be regarded as rigid. The cross-sectional profiles depicted in FIGS. 1B, 1C and 1D show chains of circles 131, 132, 133 denote the measured profile by laser vibrometer. Also shown in the insets are solid line curves 141, 142, 143, which are the finite-element simulation results. A photo image of Sample A is shown in FIG. 1E.

Measured absorption as a function of frequency for Sample A is shown in FIG. 1A, where it can be seen that there are 3 absorption peaks around 172, 340, and 813 Hz. Perhaps the most surprising is the absorption peak at 172 Hz, at which more than 70% of the incident acoustic wave energy has been dissipated, a very high value by such a 200 μm membrane at such a low frequency, where the relevant wavelength in air is about 2 meters. FIG. 1A shows this phenomenon arising directly from the profiles of the membrane resonance.

The arrows in FIG. 1A at 172, 340, and 710 Hz indicate the calculated absorption peak frequencies. The Young's modulus and Poisson's ratio for the rubber membrane are $1.9 \times 10^6$ Pa and 0.48, respectively.

In experiments, the membrane is made of silicone rubber Silastic 3133. The Young's modulus and the Poisson's ratio of the membrane were measured.

Figure 2:
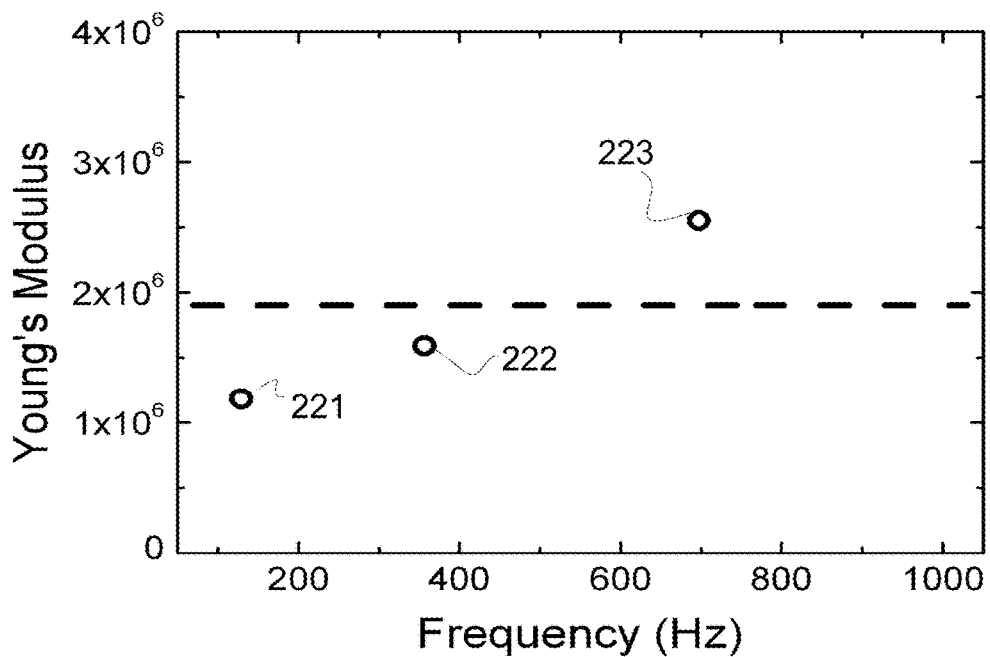
FIG. 2 is a diagram showing Young's module values.

FIG. 2 is a diagram showing Young's module values. Circles 211, 222, 223 denote the Young's modulus E at several frequencies from experimental data. The dashed curve denotes the average value $1.9 \times 10^6$ Pa which is the mean value within the relevant frequency range.

The measurement was performed in the "ASTM E-756 sandwich beam" configuration, where the dynamic mechanical properties of the membrane were obtained from the measured difference between the steel base beam (without membrane) properties and the properties of the assembled sandwich beam test article (with the membrane sandwiched in the core of the beam). In the measurement, the shear modulus ($\mu$) data of the membrane at several discrete frequencies could be obtained. The Poisson ratio (v) of the membrane was found to be around 0.48. Therefore, according to the relation between different elastic parameters, $$E = 2\mu(1+v), \quad (0.1)$$

The Young's modulus (E) is obtained at those discrete frequencies, shown as circles 211, 222, 223 in FIG. 2. For the sample material the measured E varies from $1.2 \times 10^6$ Pa to $2.6 \times 10^6$ Pa within the relevant frequency range. A frequency-independent value of the Young's modulus $E = 1.9 \times 10^6$ Pa (shown as the dashed line in FIG. 2) was chosen so as to simplify the model.

The imaginary part of the Young's modulus is taken to be in the form $\text{Im}(E) \equiv \omega \chi_0$, with the value $\chi_0 = 7.96 \times 10^2$ Pa·s obtained by fitting to the absorption. Many eigenmodes are found in the simulations. Out of these, the ones that are left-right symmetric are selected since the non-symmetric ones will not couple to the normally incident plane wave. The resulting absorption peak frequencies are located at 172, 340, and 710 Hz, respectively (indicated by the arrows in FIG. 1A). They are seen to agree very well with the observed peak frequencies.

FIGS. 1B, 1C and 1D show the cross-sectional profile of the z-displacement w along the x axis, within the unit cell for the three absorption peak frequencies. The circles denote the experimental measured data by laser vibrometer, while the solid curves are the finite-element simulation results. Excellent agreement is seen. But the most prominent feature of the profiles is that while the z-displacement w is continuous at the perimeters of the platelets (whose positions are indicated by the straight sections of the curves where the curvature is zero), there exists a sharp discontinuity in the first-order spatial derivative of w normal to the perimeter. For the low frequency resonance this discontinuity is caused by the "flapping" motion of the two semicircular platelets that is symmetric with respect to the y axis; whereas the 712 Hz resonance is caused by the large vibration of the central membrane region, with the two platelets acting as "anchors".

The flapping motion results in a motion of the platelet that is not purely translational along z-axis (defined as out of membrane plane direction). A platelet undergoes flapping motion has different displacement (with respect to its balance position) at different parts. Physically, a flapping motion of the platelet can be viewed as a superposition of translational motion along z-axis, and rotational motion along an axis that is parallel to x-axis.

The characters of these modes also dictate the manner under which their resonance frequencies are tunable: Whereas for the flapping mode the frequency is shown to decrease roughly as the inverse square root of the platelet mass, the membrane vibration mode frequency can be increased or decreased by varying the distance of separation between the two semicircular platelets as depicted in FIG. 1E. The intermediate frequency mode is also a flapping mode, but with the two ends of each wing in opposite phase. The asymmetric shape of the platelets enhances the flapping mode.

Another type of unit cell, denoted Sample B, is 159 mm by 15 mm and comprises 8 identical platelets appended symmetrically as two 4-platelet arrays (with 15 mm separation between the neighboring platelets) facing each other with a central gap of 32 mm. Sample B is used to attain near-unity absorption of the low frequency sound at multiple frequencies.

Figure 3:
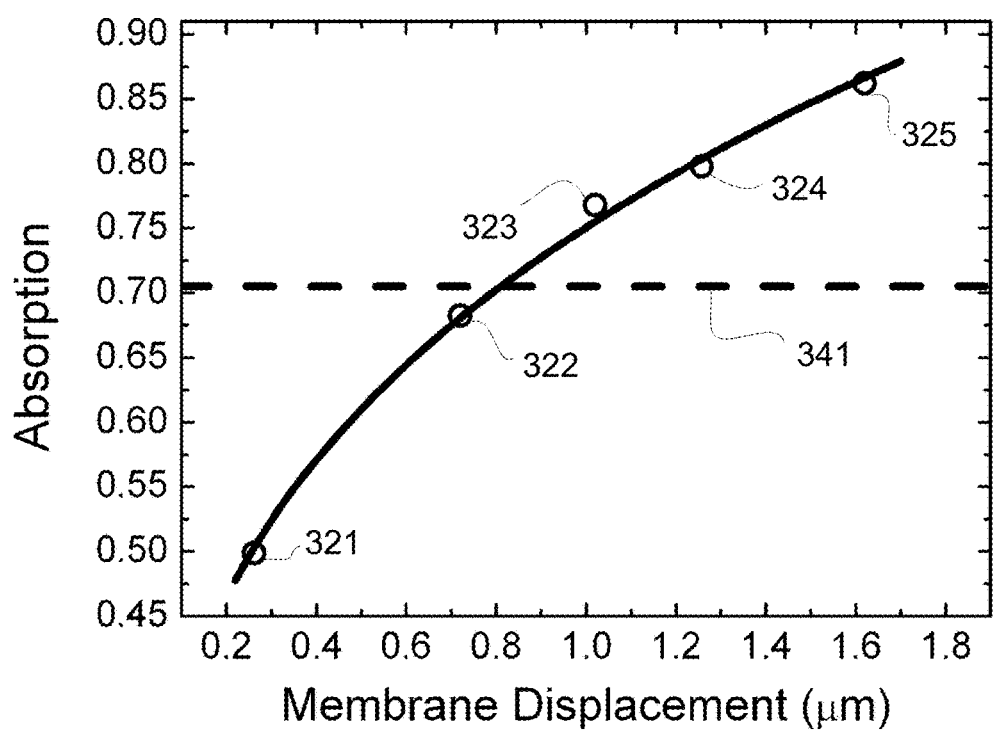
FIG. 3 is a diagram showing absorption vs. membrane displacement for a sample.

FIG. 3 is a diagram showing absorption vs. membrane displacement for Sample B, showing the results of further tuning the impedance of the membrane by placing an aluminum reflector behind the membrane. The aluminum reflector can be placed at various near-field distances behind the membrane in accordance with the desired acoustic effect. Circles 321-325 denote experimentally measured absorption coefficient and membrane displacement amplitude at 172 Hz when the distance between the membrane and the aluminum reflector was varied from 7 mm to 42 mm with 7 mm steps. Horizontal dashed line 341 denotes the absorption level when the aluminum reflector is removed, that is, when the distance between the membrane and the aluminum reflector tends to infinity.

In FIG. 3, the absorption at 172 Hz is plotted as a function of the measured maximum normal displacement of the membrane for an incident wave with pressure modulation amplitude of 0.3 Pa. Circles 321-325 each indicate a distances of separation between the membrane and the reflector, varying from 7 mm to 42 mm in steps of 7 mm each. It is seen that adding an air cushion can enhance the absorption, up to 86% at a separation of 42 mm. That is roughly 2% of the wavelength. Moving the reflector further will eventually reduce the absorption to the value without the reflector, as indicated by dashed line 341.

An explanation of the strong absorption can be found by considering the bending wave (or flexural wave) of a thin solid elastic membrane satisfying the biharmonic equation:

$$\nabla^4 w - (\rho h/D)\omega^2 w = 0,$$

where $D = Eh^3/12(1-v^2)$ is the flexural rigidity and h the thickness of the membrane.

The corresponding elastic curvature energy per unit area is given by:

$$\Omega = \frac{1}{2}D\left[\left(\frac{\partial^2 w}{\partial x^2}\right)^2 + \left(\frac{\partial^2 w}{\partial y^2}\right)^2 + 2v\frac{\partial^2 w}{\partial x^2}\frac{\partial^2 w}{\partial y^2} + 2(1-v)\left(\frac{\partial^2 w}{\partial x \partial y}\right)^2\right]. \quad (2)$$

As $\Omega$ is a function of the second-order spatial derivatives of w, when the first-order derivative of w is discontinuous across the edge boundary, it is easy to infer that the areal energy density $\Omega$ should have a very large value within the perimeter region (divergent in the limit of a thin shell). Moreover, as the second derivative is quadratic, the integrated value of the total potential energy must also be very large. In the limit of small h, the vibration modes of the system may be regarded as a weak-form solution of the shell model, in the sense that while the biharmonic equation is not satisfied at the perimeter of the platelets (since the higher-order derivatives do not exist), yet besides this set of points with measure zero the solution is still a minimum case of the relevant Lagrangian.

Figure 4:
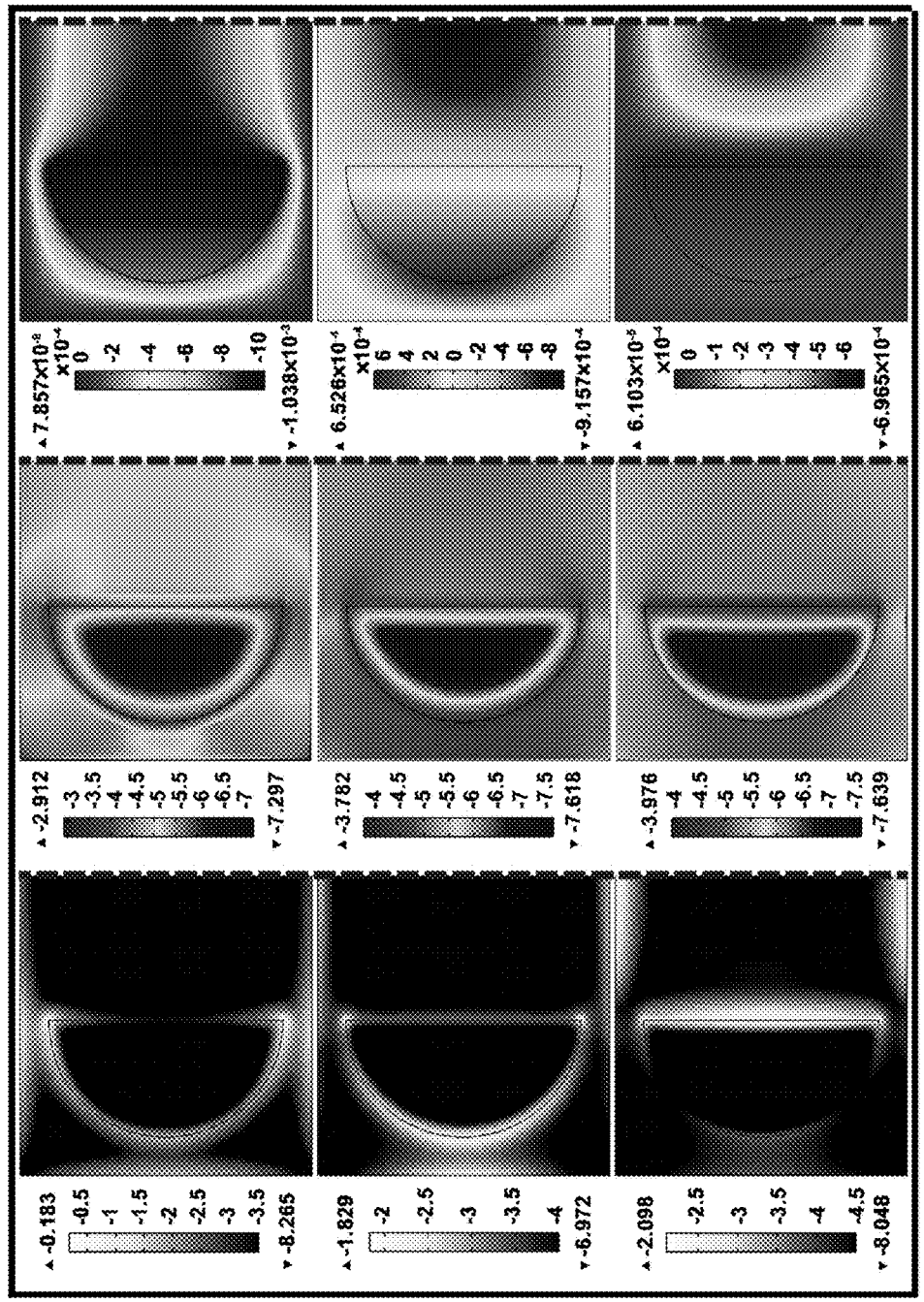
FIG. 4 is a sequence of diagrams showing calculated distributions of the elastic potential energy density (left column), trace of strain tensor (middle column), and displacement w within the xy plane (right column).

FIG. 4 is a sequence of diagrams showing calculated distributions of the elastic potential energy density (left column), trace of strain tensor $\epsilon = \epsilon_{xx} + \epsilon_{yy} + \epsilon_{zz}$ (middle column), and displacement w (right column) within the xy plane. The behavior is the result of the motion of the platelet, which is not purely translational along z-axis. The platelet undergoes flapping motion, and therefore has different displacement with respect to its balance position at different parts. Physically, a flapping motion of the platelet can be viewed as a superposition of translational motion along z-axis, and rotational motion along an axis that is parallel to x-axis. The three rows, from top to bottom, are respectively for the 3 absorption peak frequencies-190 Hz, 346 Hz, and 712 Hz. The left and middle columns' colors bars indicate the relative magnitudes of the quantities in question, with the numbers shown to be the logarithms of the magnitudes, base 10. The right column's color bar is linear in its scale. Since these modes are symmetric with respect to the x coordinate, only the left half is plotted for better visibility. The straight dashed blue lines indicate the mirroring planes.

The predicted large value of $\Omega$ within the perimeter region is easily verified as shown in FIG. 4, where a plot is made of the elastic potential energy density U obtained from the COMSOL simulations (left column, where the color is assigned according to a logarithmic scale, base 10) and displacement w (right column) distribution within the xy plane (mid plane of the membrane) around 3 absorption peak frequencies, 190, 346, and 712 Hz (from top to bottom), respectively. The energy density in the perimeter region is seen to be larger than that in other regions by up to 4 orders of magnitudes. There are also high energy density regions at the upper and lower edges of the unit cell, where the membrane is clamped. In the simulations, the integrated energy density U within the perimeter region accounts for 98% (190 Hz), 87% (346 Hz), and 82% (712 Hz) of the total elastic energy in the whole system. As the local dissipation is proportional to the product of energy density with dissipation coefficient, the large multiplying effect implied by the huge energy density can mean very substantial absorption for the system as a whole. This fact is also reflected in the strain distribution around the three absorption peak frequencies, as shown in the middle column of FIG. 4. It is found that the strain in the perimeter region, on the order of $10^{-3}$ to $10^{-4}$, is much larger than that in the other parts of the membrane by at least 1 to 2 orders of magnitude.

In a conventional open system, high energy density is equally likely to be radiated, via transmitted and reflected waves, as to be absorbed. It is noted that in the present case, the small volumes in which the elastic energy is concentrated may be regarded as an "open cavity" in which the lateral confinement in the plane of the membrane is supplemented by the confinement in the normal direction, owing to the fact that the relative motion between the platelets and the membrane contributes only minimally to the average normal displacement of the membrane. Hence from the dispersion relation $k_{\parallel}^2 + k_{\perp}^2 = k_o^2 = (2\pi/\lambda)^2$ for the waves in air, where the subscripts ($\parallel$) and ($\perp$) denote the component of the wavevector being parallel (perpendicular) to the membrane plane, it can be seen that the relative motions between the platelets and the membrane, which must be on a scale smaller than the sample size $d \ll \lambda$, can only couple to the evanescent waves since the relevant $k_{\parallel}^2 \gg k_o^2$. Only the average normal displacement of the membrane, corresponding to the piston-like motion, would have $k_{\parallel}$ components that are peaked at zero and hence can radiate. But the high energy density regions, owing to their small lateral dimensions, contribute minimally to the average component of the normal displacement.

In accordance with the Poynting's theorem for elastic waves, the dissipated power within the membrane can be calculated as $$Q = 2\omega^2 (\chi_o/E) \int U dV. \quad (2)$$

Absorption is defined as Q/(P·S), where $P = p^2/(\rho c)$ denotes the Poynting's vector for the incident acoustic wave and S is membrane's area, with p being the pressure amplitude. With the previously given parameter values, the absorption at the three resonant frequencies (in the order of increasing frequency) is calculated to be 60%, 29%, and 43%, respectively. It is noted that the calculated values reproduces the relative pattern of the three absorption peaks, although they are smaller than the experimental values by ~10-20%. This discrepancy is attributed to the imperfection in the symmetry of the sample, whereby a multitude of asymmetric vibrational eigenfunctions can be excited by the normally incident plane wave. Together with the width of these modes, they can effectively contribute to a level of background absorption not accounted for in the simulations.

It should be noted that the present membrane-type metamaterials differ from the previous approaches that were based on the different mechanism of anti-resonance occurring at a frequency that is in-between two eigenfrequencies, at which the structure is decoupled from the acoustic wave (and which also coincides with the diverging dynamic mass density), thereby giving rise to its strong reflection characteristic. Without coupling, there is naturally almost no absorption at the anti-resonance frequency. But even at the resonant eigenmode frequencies where the coupling is strong, the measured absorption is still low, owing to the strong coupling to the radiation mode that leads to high transmission. In contrast, for the dark acoustic metamaterials the high energy density regions couple minimally with the radiation modes, thereby leading to near-total absorption as in an open cavity.

Figure 5A:
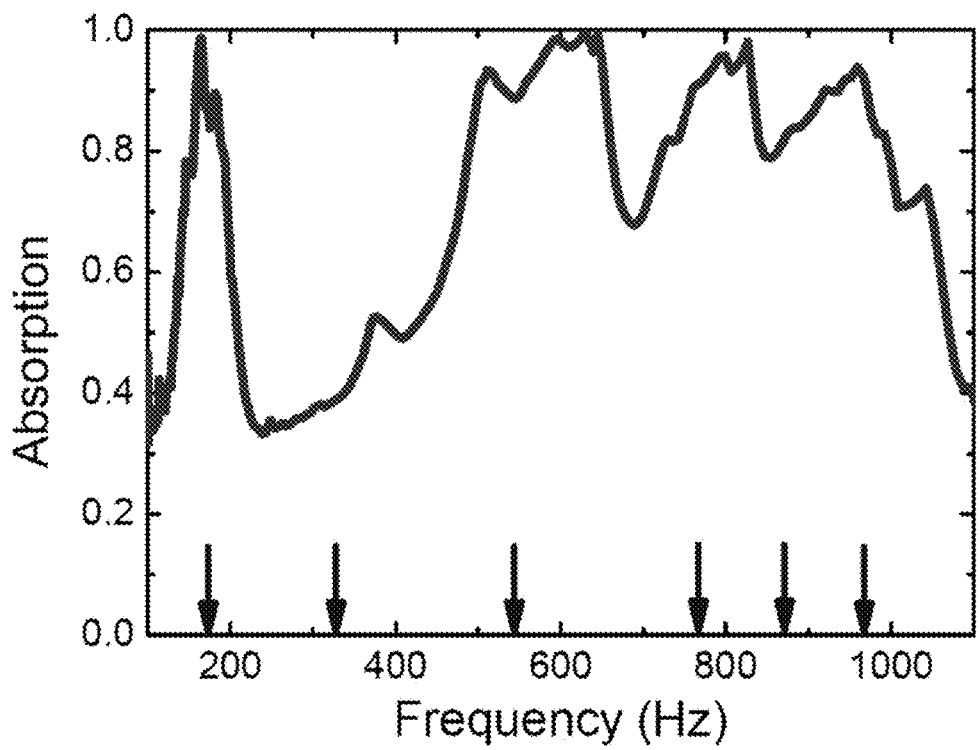
FIG. 5A shows the measured absorption coefficient for a 2 layer sample.
Figure 5B:
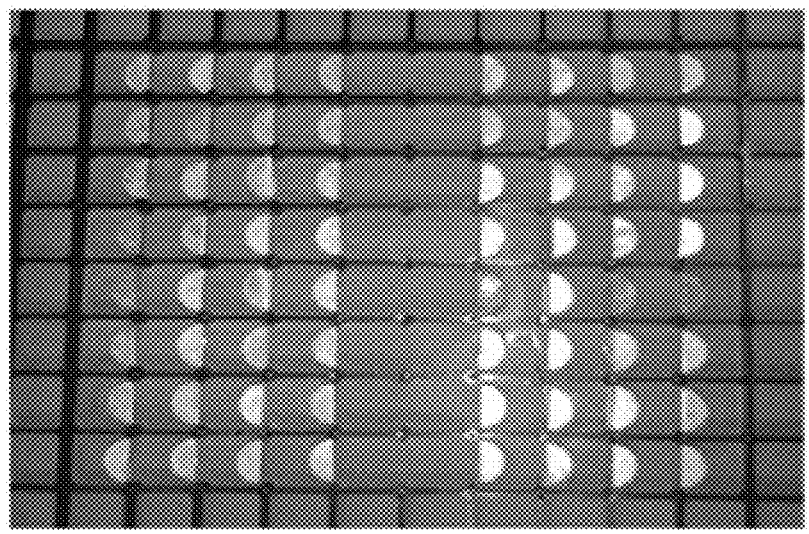
FIG. 5B is a photographic image of the structure.

FIG. 5A shows the measured absorption coefficient for 2 layers of Sample B. A photo image of the array is shown in FIG. 5B. In the measurements, the impedance of the system is tuned by placing an aluminum reflector 28 mm behind the second layer. The distance between the first and second layers was also 28 mm. It can be seen that there are many absorption peaks around 164, 376, 511, 645, 827, and 960 Hz. The absorption peaks at 164 Hz and 645 Hz are seen to be ~99%. By using COMSOL, the absorption peak frequencies for a single layer of Sample B are also calculated. They are located around 170, 321, 546, 771, 872, and 969 Hz, respectively. These are indicated by blue arrows in FIG. 3. Reasonably good agreement with the experimental values is seen, with no adjustable parameters.

The curve indicates the experimentally measured absorption coefficient for 2 layers of Sample B. An aluminum reflector was placed 28 mm behind the second layer. The distance between the first and second layers is also 28 mm. Referring to FIG. 5A, the absorption peaks are located around 164, 376, 511, 645, 827, and 960 Hz, respectively. Blue arrows indicate the positions of the absorption peak frequencies predicted by finite-element simulations. Good agreement is seen.

Figure 6A:
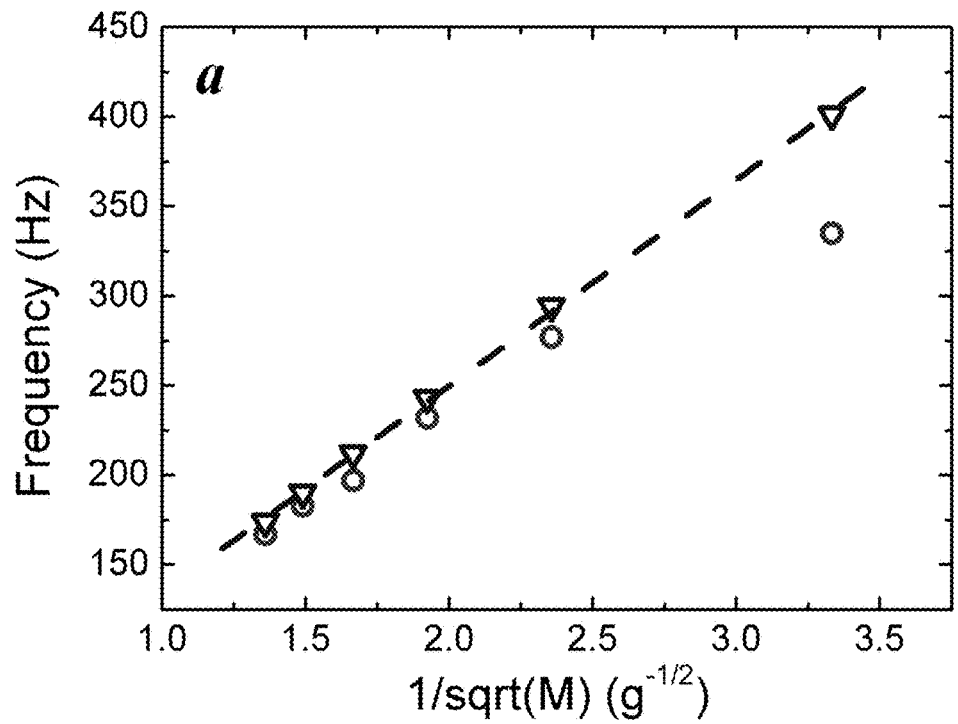
FIGS. 6A and 6B are diagrams showing absorption peak frequency as an inverse square of mass at 172 Hz (FIG. 6A) and as an inverse of plate-plate distance at 813 Hz (FIG. 6$b$).
Figure 6B:
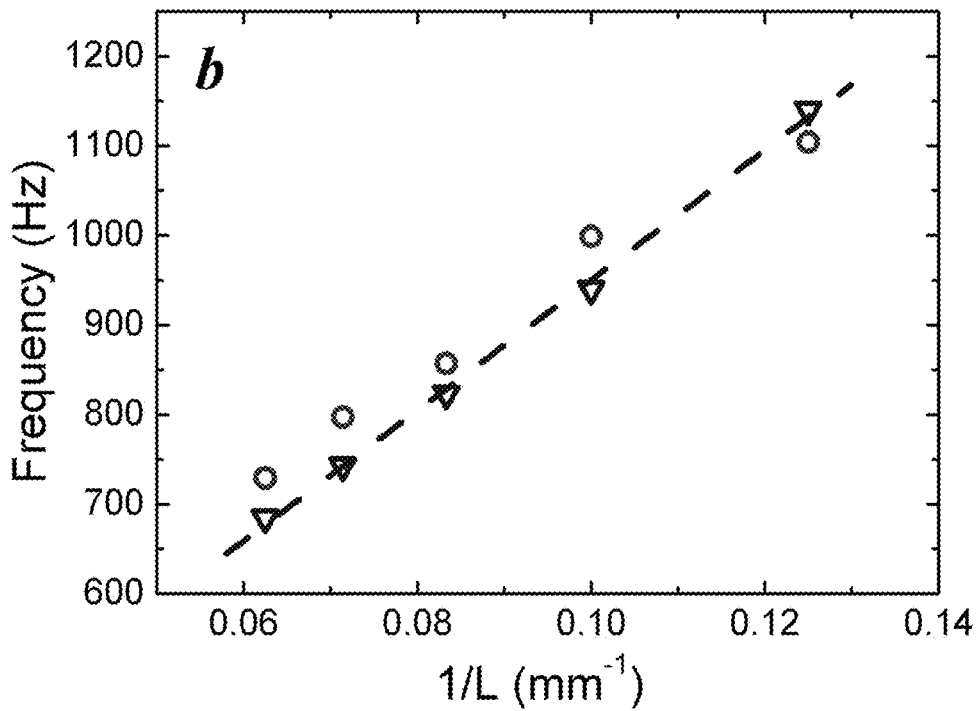

FIGS. 6A and 6B are diagrams showing absorption peaks as an inverse square of mass at 172 Hz (FIG. 6A) and as an inverse of plate-to-plate distance at 813 Hz (FIG. 6B). In FIG. 6A, it is seen that the 172 Hz absorption peak moves to higher frequencies as the inverse of the square root of each platelet's mass M. In FIG. 6B, the 813 Hz peak is seen to vary as the inverse separation L between the two platelets. Here the circles denote experimental data, and triangles the simulation results.

Eigenmode Frequencies

To contrast with the previous membrane-type metamaterials that exhibit near-total reflection at an anti-resonance frequency, the mechanism of such metamaterials as well as present their measured absorption performance will be described.

Figure 7A:
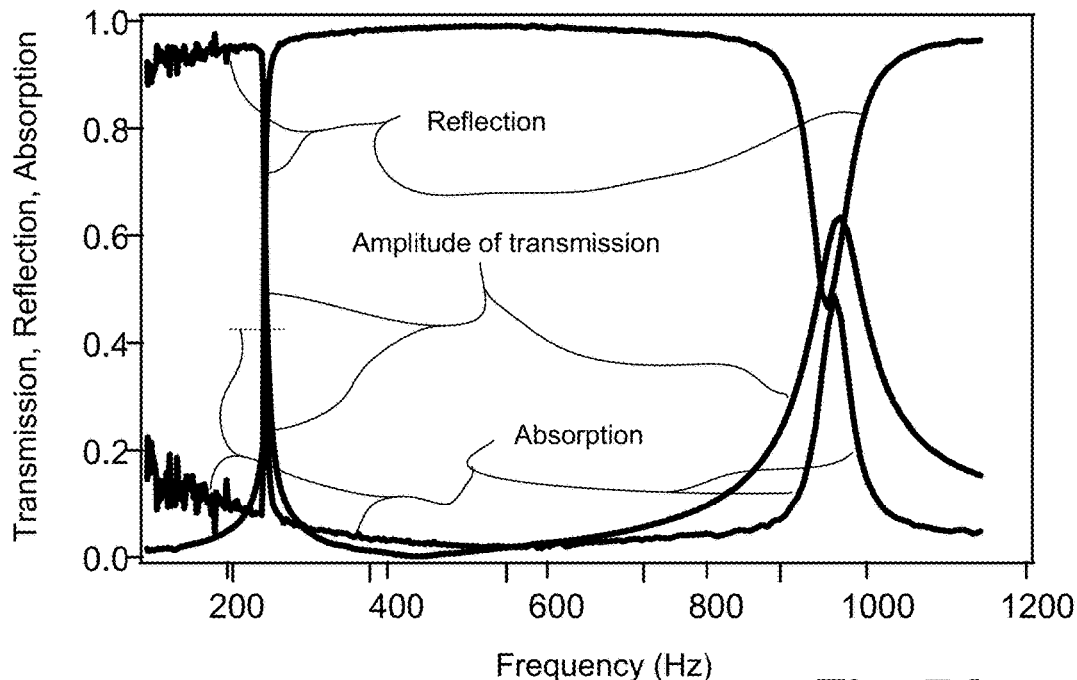
FIGS. 7A and 7B are diagrams showing absorption for a one-layer anti-resonance reflective membrane (FIG. 7A) and a five layer anti-resonance reflective membrane structure (FIG. 7B).
Figure 7B:
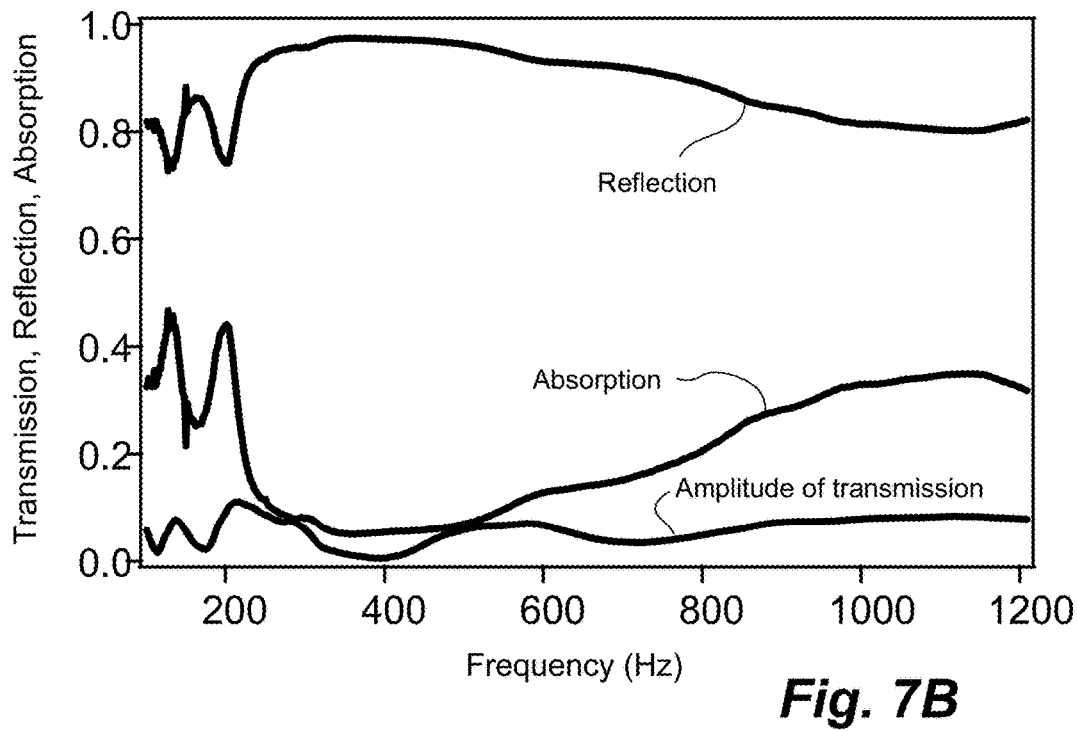

FIGS. 7A and 7B are diagrams showing absorption for a one-layer anti-resonance reflective membrane (FIG. 7A) and a five-layer anti-resonance reflective membrane structure (FIG. 7B). The amplitudes shown are transmission, reflection and absorption. The amplitude of transmission is shown in the middle curve in FIG. 7A, except at lowest frequencies where the reflection is the middle curve in both figures, and bottom curve in FIG. 7B. The amplitude of reflection is shown on the top curves in both figures (FIGS. 7A and 7B). The absorption is shown and absorption in the lower curve in FIG. 7A, except at lowest frequencies where the absorption is the middle curve in both figures, and at middle curve in FIG. 7B. (The horizontal line in FIG. 7A shows the lower frequency peak absorption, depicted because the curves overlap in that figure.)

Strong reflection of sound can occur at a frequency in-between two neighboring resonant (eigenmode) frequencies. In contrast, at the resonant eigenmode frequency the excitation of the eigenmodes can lead to transmission peaks, at the anti-resonance frequency the out-of-phase hybridization of two nearby eigenmodes leads to a near-total decoupling of the membrane structure from the radiation modes. This turns out to also coincide with a divergent resonance-like behavior of the dynamic mass density. Near-total reflection of the acoustic wave is thereby the consequence at the anti-resonance frequency. Since the structure is completely decoupled from the acoustic wave at the anti-resonance frequency, the absorption is naturally very low as shown in FIG. 7A at around 450 Hz. But even at the resonant eigenfrequencies, it is noted that the absorption coefficient for this type of metamaterial is still low, barely reaching 45% at the relatively high frequency of 1025 Hz, which is significantly less that that achieved with the dark acoustic metamaterials. This is attributed to the relatively strong coupling to the radiation modes caused by the piston-like motion of membrane that can lead to high transmission (0.88 at 260 Hz, 0.63 at 1025 Hz).

Even for a five-layer sample, the averaged absorption coefficient is a mere 0.22, with maximum value not surpassing 0.45, as shown in FIG. 7B. It is noted that besides the large number of membrane layers, this sample was also sandwiched by two soft panels with holes, with the expressed purpose of enhancing the absorption. Therefore even with these efforts this panel's absorption performance is still way below the dark acoustic metamaterials.

Experimental Set-Up

Measurements of the absorption coefficients were conducted in a modified impedance tube apparatus comprising two Brüel & Kjær type-4206 impedance tubes with the sample sandwiched in between. The front tube has a loud speaker at one end to generate a plane wave. Two sensors were installed in the front tube to sense the incident and reflected waves, thereby obtaining both the reflection amplitude and phase. The third sensor in the back tube (which is terminated with an anechoic sponge) senses the transmitted wave, to obtain the transmission amplitude and phase. The signals from the three sensors are sufficient to resolve the transmitted and reflected wave amplitudes, in conjunction with their phases. The absorption coefficient was evaluated as $A=1-R^2-T^2$, with R and T being the measured reflection and transmission coefficients, respectively. The absorption measurements were calibrated to be accurate by using materials of known dissipation.

The cross-sectional profiles of the z-direction displacement shown in the insets of FIG. 1A were obtained by using the laser vibrometer (Type No. Graphtec AT500-05) to scan the Sample A along the x axis, within the unit cell around the 3 absorption peak frequencies.

Theory and Simulations

The numerical simulation results shown in FIGS. 1A, 2, and 3 were obtained using "COMSOL MULTIPHYSICS", a finite-element analysis and solver software package. In the simulations, the edges of the rectangular membrane are fixed. An initial stress in the membrane, $\sigma_x^{initial}=\sigma_y^{initial}=2.2\times10^5$ Pa was used in the calculation as the tunable parameter to fit the data. The mass density, Young's modulus and Poisson's ratio for the rubber membrane are 980 kg/m$^3$, 1.9×10$^6$ Pa, and 0.48, respectively. The mass density, Young's modulus and Poisson's ratio for the iron platelets are 7870 kg/m$^3$, 2×10$^{11}$ Pa, and 0.30, respectively. Standard values for air, i.e., $\rho=1.29$ kg/m$^3$, ambient pressure of 1 atm, and speed of sound in air of c=340 m/s, were used. Radiation boundary conditions were used at the input and output planes of the air domains in the simulations.

Absorption at Oblique Incidence

The dark acoustic metamaterials, especially Sample B, can exhibit many resonant eigenmodes. At normal incidence only those eigenmodes with left-right symmetry can be coupled to the incident wave. While imperfections in the sample can cause some coupling with the non-symmetric modes that may be responsible for the higher observed background absorption than that obtained by simulations, it would be interesting to use oblique incidence to purposely probe the consequence of exciting more modes in Sample B.

Figure 8:
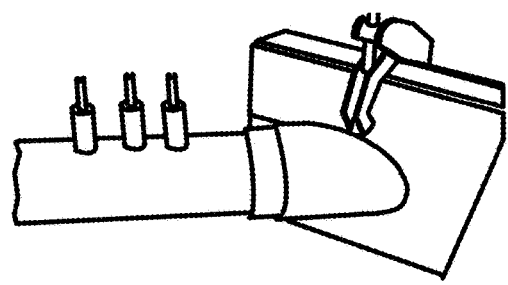
FIG. 8 is an image of an experimental setup for oblique incidence at 45°.
Figure 9A:
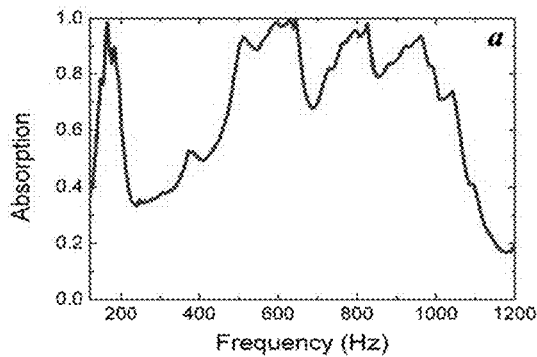
FIG. 9 are diagrams showing absorption coefficients measured for different incident angles: 0° (FIG. 9A), 15° (FIG. 9B), 30° (FIG. 9C), 45° (FIG. 9D), and 60° (FIG. 9E).
Figure 9B:
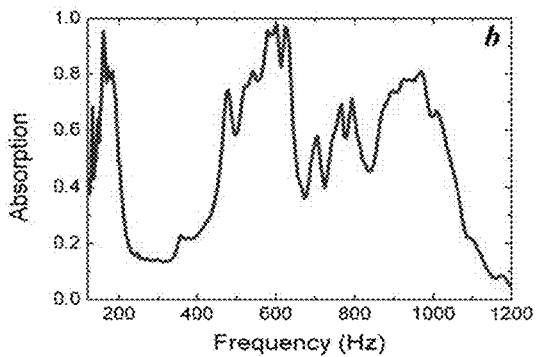
Figure 9C:
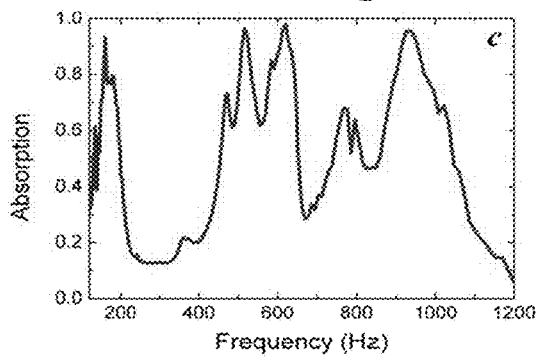
Figure 9D:
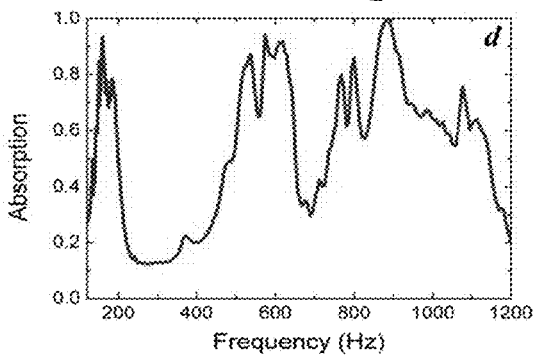
Figure 9E:
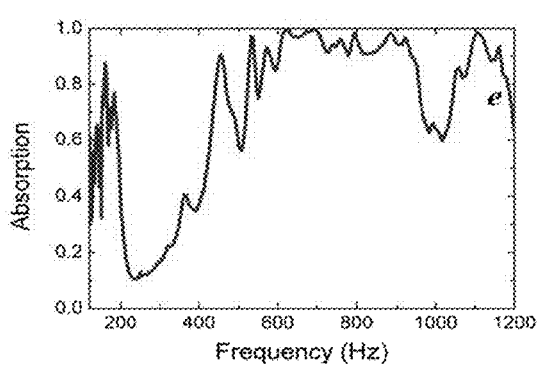

FIG. 8 is an image of an experimental setup for oblique incidence at 45°. This setup can be adjusted for different incident angles in order to test absorption, as depicted in FIGS. 9A-9E. FIGS. 9 are diagrams showing absorption coefficients measured for different incident angles: 0° (FIG. 9A), 15° (FIG. 9B), 30° (FIG. 9C), 45° (FIG. 9D), and 60° (FIG. 9E).

Off-normal incidence measurements were carried out with Sample B for 4 oblique incident angles —15°, 30°, 45° and 60°. The experimental setup for oblique incidence is shown in FIG. 8. The measured absorption coefficients for different angles are shown in FIGS. 9A-9E. The results indicate qualitative similarity up to 60°, at which angle the frequency ranges of 650-950 Hz and 1000-1200 Hz exhibit a pronounced increase in absorption. This is attributed to the fact that large off-normal incident angle can excite many more resonant modes which were decoupled by the left-right symmetry under the condition of normal incidence.

Hence the acoustic metamaterials can actually perform as a limited broad-band, near-total absorber at oblique incidence.

As mentioned earlier, there are many eigenmodes in the system which are decoupled from the normally incident wave owing to its left-right symmetry. In order to explore the consequence when such symmetry is broken, measurements on Sample B were also carried out under oblique incidence. The measured results indicate qualitative similarity up to 60°, at which angle the frequency ranges of 650-950 Hz and 1000-1200 Hz exhibit a pronounced increase in absorption. Thus the overall performance of the dark acoustic metamaterials does not deteriorate under a broad range of incident angles but may even improve within certain frequency regimes.

Use of Hinges in Metamaterials

FIGS. 10-13 are schematic representations of alternate metastructures in which planar structures or platelets are attached with frictional hinge arrangements.

FIGS. 10A-10C is a schematic representation of a first alternate metastructure, depicted as a side mount structure. FIG. 10A is a top view; FIG. 10B is a front view; and FIG. 10C is a side view of the first alternate metastructure. Depicted are membrane body material 1011, rigid platelets 1012 and hinges 1013. Membrane body material 1011 may be rubber, plastic sheeting, aluminum or other suitable material that can display elastic restoring force with small displacement normal to the membrane. Rigid platelets 1012 are as described above in connection with FIGS. 1-9. Hinges 1013 may be constructed of either metallic or elastic components to afford rotational movement of the hinge that is linked to a dissipative mechanism, such as the eddy current dissipation via the Faraday's law (with a permanent or electromagnet installed in the vicinity so as to induce the eddy current), or to a dissipative gel so that the rotational movement of the hinge can induce dissipation as through a dashpot.

FIGS. 11A, 11B and 11C are schematic representations of a second alternate metastructure, depicted as a bottom mount structure. FIG. 11A is a top view; FIG. 11B is a front view; and FIG. 11C is a side view. Depicted are membrane body material 1111, rigid platelets 1112 and hinges 1113. The materials for membrane body material 1111, rigid platelets 1112 and hinges 1113 may be as described for the structure of FIGS. 10A-10C.

FIGS. 12A, 12B and 12C are schematic representations of a third alternate metastructure, depicted as a side mount structure. FIG. 12A is a top view; FIG. 12B is a front view; and FIG. 12C is a side view. Depicted are membrane body material 1211, rigid platelets 1212 and hinges 1213. The materials for membrane body material 1211, rigid platelets 1212 and hinges 1213 may be as described for the structure of FIGS. 10A-10C.

FIGS. 13A, 13B and 13C are schematic representations of a fourth alternate metastructure, depicted as a bottom mount structure. FIG. 13A is a top view; FIG. 13B is a front view; and FIG. 13C is a side view. Depicted are membrane body material 1311, rigid platelets 1312 and hinges 1313. The materials for membrane body material 1311, rigid platelets 1312 and hinges 1313 may be as described for the structure of FIGS. 10A-10C.

The vibration damping device may be constructed to comprise a grid of a two-dimensional array of cells fixed on a rigid frame. A significant difference between this configuration and that of the configuration with thin elastic membranes augmented with rigid platelets lies in the use of frictional hinges to absorb the vibration energy. In the arrangements of FIGS. 10 through 13, the device is essentially the same as the configuration with thin elastic membranes augmented with rigid platelets, except that a hard aluminum plate is not required.

In the arrangements of FIGS. 11 through 13, the platelets are joined by frictional hinges. In each of the arrangements of FIGS. 10-13, the elastic membrane can be mounted on the bottom of the platelets (bottom-mount, FIGS. 10 and 12) or mounted on the sides of the platelets (side mount, FIGS. 11 and 13). The platelets may be arranged in, but not limited to, the following patterns. In the structure of FIG. 10, each pair of platelets is joined by a hinge to form a unit, and membranes are attached to the side of the platelets to join the units and the frame together. In the structure of FIG. 11, the entire membrane is mounted on the frame, and the platelet units are attached onto the membrane. In the structure of FIG. 12, four platelets are joined by three hinges to form a unit, and the units and the frame are joined by membranes mounted on the sides of the platelets. In the structure of FIG. 13, the platelet unit is the same as in the structure of FIG. 11, except that membrane covers the whole frame. The platelet units are mounted onto the membrane.

The working principle of the structures in the configurations of FIGS. 10-13 is essentially the same as described for FIGS. 1-9. The additional feature in these structures is the use of the hinge structure in acoustic noise/vibration absorption/damping. This is accomplished by a frictional hinge joining each pair of platelets and/or the use three hinges joining four platelets to damp the vibrational motion in two perpendicular directions. The hinges provide necessary friction to dissipate mechanical energy when the platelets rotate about the hinge axis. When the device is attached to a host structure, such as a beam, a plate (e.g., a car door or chassis), etc., where damping of vibration is desired, vibration of the host structure is passed onto the frame, which can cause the resonances of the membrane-platelet system. Since the platelets are relatively rigid and therefore will not be deformed, the overall motion of the device will be concentrated and amplified at the hinges. As the rotational torque at the hinge will be exaggerated by the leverage effect (such as in the hinges of a door), the resulting enhanced force density inside the hinge can facilitate the dissipation of the mechanical energy. The hinges provide dissipation in addition to the edges of the platelets where there is high concentration of curvature energy density as in the previous intention. By using hinges, the curvature energy is replaced by the rotational torque and its amplified force density inside the hinge. Here the device does not require a hard reflector, since no acoustic energy is involved.

Various frictional mechanisms may be used in the hinges. One is the use of eddy current dissipation via the Faraday law. Others mechanisms can include the use of viscous fluid, such as in a dashpot, or the use of moving of air through small holes. The hinges should have a restoring mechanism so as to maintain a flat geometry of the device in the absence of external vibrations.

In the configurations of FIGS. 10-13 the devices should be attached to the targeted vibration source by using some form of solid support located strategically at selected points of the source. Such support should allow the relative free motions between the platelets so as to cause dissipation of the mechanical energy.

The use of hinges has several advantages. First, hinges can provide dissipation of a much larger amount of energy, e.g., in the case of large vibrations or even seismic waves. Second, hinges can be designed so that they do not suffer material fatigue as in the case of membrane. Third, the hinges can act as the energy conversion units (e.g., if magnetic dissipation is envisioned) so that the vibration energy may be partially converted into stored electrical energy.

Membranes made of Materials other than Rubber

Figure 14:
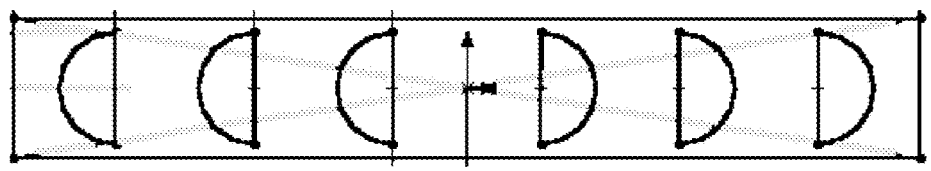
FIG. 14 is a schematic diagram showing the configuration of a measured sample.
Figure 15:
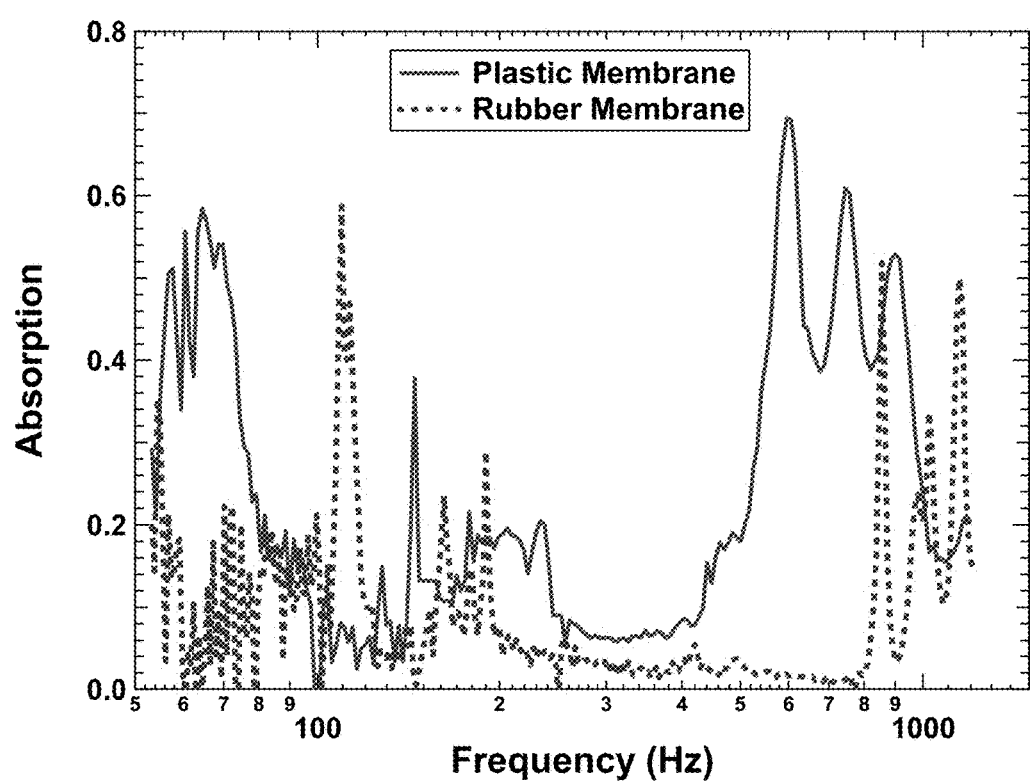
FIG. 15 is a graphic depiction showing absorption spectra of two samples with plastic wrap sheeting and rubber sheets as membrane.
Figure 16:
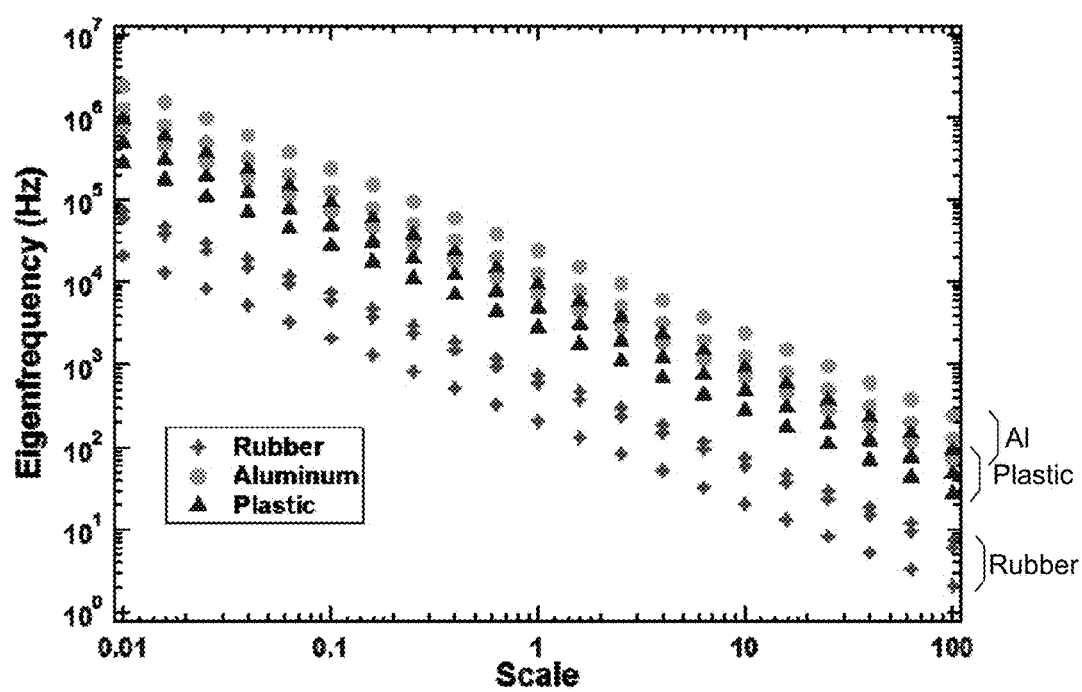
FIG. 16 is a graphic depiction showing the first three lowest eigenfrequencies of a two-unit structural unit obtained by finite element simulations.

FIGS. 14-16 are diagrams showing a simplified configuration implemented with plastic wrap sheeting and rubber sheets as membrane. FIG. 14 is a schematic diagram showing the configuration of a measured sample. FIG. 15 is a graphic depiction showing absorption spectra of two samples with plastic wrap sheeting and rubber sheets as membrane. FIG. 16 is a graphic depiction showing the first three lowest eigenfrequencies of a two-unit structural unit obtained by finite element simulations.

In the configuration of FIG. 14, the rubber sheet used is of the same type as in the configurations of FIGS. 1-9. The three types of materials for the membrane in FIG. 16 are: rubber 1411 used in connection with FIGS. 1-9, acrylonitrile butadiene styrene (ABS) hard plastic (not the plastic wrap sheeting depicted in FIGS. 14-15), and thin aluminum sheet. Some of these materials have limited elasticity, but have sufficient flexibility to allow movement of the platelets. In this non-limiting example, another material (ABS) is used to show the versatility of the design. Also, by way of non-limiting example, the membranes may be constructed of the familiar types of materials frequently used for food packaging in home kitchens, e.g., 0.1 mm thick plastic wrap. It is seen that by changing rubber to aluminum, the eigenmodes can be varied by two orders of magnitude. Within the same membrane material, the eigenfrequency f and the lateral dimension D follows the simple scaling law. It can be seen that, by adjusting the design parameters, one can cover a much wide frequency range than in the configurations of FIGS. 1-9. The source of the restoring force is due to distortion of the membrane. Its strength gets weaker with increasing lateral-dimension. Together with the increasing mass of the platelets, the eigenmode frequencies decrease with the increase of lateral dimension.

In the devices described in connection with FIGS. 1-9, the metamaterials comprise thin elastic membranes augmented with rigid platelets. In that configuration, vibration energy can be highly concentrated on certain parts, such as the edges of the platelets, and dissipated to heat by the internal friction of the membranes. As Hook's law generally applies to solid materials, a membrane of any solid will in principle behave like a rubber membrane as described above; i.e., provide a restoring force to the platelets when they are displaced, and exhibit friction either within the membrane or as a result of air viscosity. By choosing the right thickness and elasticity, such as the Young's modulus and the Poisson ratio of the membrane, the mass and dimension of the platelets, and the cell dimension, working frequency in the range from subsonic (below 1 Hz) to ultrasonic (above 1 MHz) can be covered. The key element of this configuration is the existence of the restoring force exerting by the membrane when the platelets are displaced. This can be achieved if the membrane is generally tight, rather than loose, but not necessarily pre-stretched as in the configurations of FIGS. 1-9. This configuration works best if the membrane is crease-free but small creases do not significantly affect the function of the metamaterials. In this respect, if the creases are small enough, the creases are considered to be insignificant imperfections that can be caused by imperfect fabrication processes. The membrane can have thickness variation across the cell, as the general principle is still applicable.

The structure can be realized in a number of ways. One technique is to punch-through a plastic sheet or a metal sheet without soldering, which would also be the case with the rubber sheet. It can be formed by one-step molding or sintering, or by photolithography if the structure is small.

FIG. 15 is a graphic depiction showing absorption spectra of two samples with plastic wrap sheeting and rubber sheets as membrane. In the samples, the mass of each half-circular platelet is 230 mg for the plastic wrap sheeting sample, and 460 mg for the rubber membrane sample. Both spectra exhibit typical pattern as the metamaterials in the configuration as described in FIGS. 1-9. There are some absorption peaks below 200 Hz, and a group of absorption peaks above 500 Hz. Due to the weaker elasticity of the plastic wrap sheeting, the absorption peaks of the plastic wrap sheeting sample are at lower frequency than that of the rubber sheet sample, each though the mass of the platelets are only half of that in the rubber membrane sample. The absorption spectra are essentially the same as in FIG. 5A. The only differences are in the actual frequencies where absorption peaks occur, and that the peaks are lower than in FIG. 5A because in that work two identical samples were stacked and there was an air chamber about 40 mm in depth behind the samples. It is therefore clear that absorption based on the same physical principle as described in connection with FIGS. 1-9 can occur in similar structures with membranes made of solids materials other than rubber.

FIG. 16 is a graphic depiction showing the first three lowest eigenfrequencies of a two-unit structural unit obtained by finite element simulations. In this sample platelets are 0.1 mm thick and made of iron. The membrane thickness is 0.2 mm. The movable masses are 12 mm diameter, separated by 15.5 mm from their straight line attachment portions, and on a platelet which is 15 mm wide and 31 mm long. The lateral dimensions are scaled proportionally by the same common factor, which is the horizontal axis of the figure. The dimensions of the structural unit in the insert is for Scale=1. The lateral dimensions are then proportionally varied while keeping the membrane and platelet thicknesses fixed. For example, Scale=10 means that the lateral dimensions of the cell are all enlarged by 10 times, i.e., the cell is 310 mm by 150 mm while the diameter of the disks is 120 mm. The results show, by way of non-limiting example, that working frequencies in the range from 1 Hz to 1 MHz can be covered by varying the lateral scale and the membrane materials.

Wrinkled Membrane Structures

FIGS. 17A and 17B are schematic drawings of a sound attenuation structure with wrinkled membranes for sound blocking, using a single platelet per cell. FIG. 17A is a side view and FIG. 17B is a top or plan view. Depicted are hard frame 1701, membrane 1703 with corrugated section 1704 and flat sections 1705, 1706. Platelet 1710 of a predetermined mass is attached to and suspended on membrane 1703 on flat section 1706 and is circled by corrugated section 1704. The materials used for form membrane 1703 can have limited elasticity, but have sufficient flexibility to allow movement of the platelets, with corrugated section 1704 effectively making membrane 1703 elastic.

The wrinkles or corrugations are shown, by way of non-limiting example, in the form of concentric circle as corrugated section 1704 in the intermediate part of circular membrane 1703 with its outer boundary fixed to hard frame 1701. The central part 1706 and the outermost part 1705 of the membrane remains flat. Alternatively, the wrinkled pattern can be in other geometric shapes, such as square or hexagon, depending on the shape of the hard frame.

FIGS. 18A and 18B are schematic drawings of sound attenuation structures with wrinkled membranes for sound absorption, in which multiple platelets are attached to a wrinkled or corrugated membrane. FIG. 18A is a side view and FIG. 18B is a top or plan view. Depicted are hard frame 1801, membrane 1803 with corrugated sections 1811-1815 and flat sections 1821-1826. Platelets 1831-1834 are attached to and suspended on membrane 1803 on flat sections 1822-1825. Platelets 1831-1834 can have substantially the same predetermined mass or multiple different predetermined masses.

The arrangement of FIGS. 18A and 18B uses wrinkles or corrugations in sections 1811-1815 in the form of parallel lines in some part of membrane 1803 with its outer boundary fixed on hard frame 1801.

Conclusion

It has been demonstrated that the combined effect of very large curvature energy density at the perimeter of the platelets, in conjunction with its confinement effect, can be particularly effective for subwavelength low frequency acoustic absorption. Since the membrane system has also been shown to be effective in totally reflecting low frequency sound, together they can constitute a system of low frequency sound manipulation with broad potential applications. In particular, lowering the cabin noise in airliners and ships, tuning the acoustic quality of music halls, and environmental noise abatement along highways and railways are some promising examples.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A sound absorption panel comprising:
a substantially acoustically transparent planar, rigid frame divided into a plurality of individual, substantially two-dimensional cells;
a sheet of a flexible material fixed to the rigid frame, and a plurality of platelets fixed to the sheet of flexible material such that each cell is provided with a respective platelet, thereby establishing a resonant frequency, the resonant frequency defined by the planar geometry of the respective individual cells, the flexibility of the flexible material and said respective platelet thereon and establishing an increase in an absorption coefficient of the panel;
the cells comprising rigid platelets, wherein the rigid platelets have a flapping mode providing a tunable function; and
the flexible material having a wrinkle or corrugation to permit distortion with reduced material elasticity, thereby permitting the flexible material to distort beyond that afforded by a planar material of the same type, while retaining mechanical strength in supporting the plurality of platelets.

2. The sound absorption panel of claim 1, wherein the wrinkle or corrugation of the sheets results in the resonant frequencies of the cells by lowering the resonant frequencies as compared to that achieved by the use of flat membrane of the same material.

3. The sound absorption panel of claim 1, wherein the thickness of the sheet of solid materials varies across the cell.

4. The sound absorption panel of claim 1, further comprising:
multiple layers of said solid material.

5. The sound absorption panel of claim 1, further comprising:
a plurality of panels stacked together wherein each said panel comprises a rigid frame divided into a plurality of individual cells, a sheet of a solid material, and a plurality of platelets, with each platelet fixed to said sheet of solid material to provide each cell with a respective platelet; and
a working frequency of the sound absorption structure defined by the planar geometry of the individual cells, the flexibility of said solid material, and said respective platelet thereon.

6. The sound absorption panel of claim 5, further comprising:
each said panel formed with platelets having different weights from other said panels in the panel.

7. The sound absorption panel of claim 1, further comprising:
adjacent frames facing each other with a distance having a predetermined relationship to the size of said frames.

8. The sound absorption panel of claim 1, wherein the flapping mode provides the tunable function whereby the frequency decreases in an approximate relationship to the inverse square root of the mass of platelets.

9. The sound absorption panel of claim 1, wherein the flapping mode provides the tunable function whereby the flapping mode provides a tunable function based on the tunable resonant frequencies, said resonant frequencies tunable by varying the distance of separation between asymmetric platelets, or the thickness, elasticity, such as the Young's module and the Poisson ratio, and the wrinkle patterns of the membrane, the mass of the platelets, and the cell dimension.

10. The sound absorption panel of claim 1, further comprising:
a plurality of platelets in each unit cell.

11. The sound absorption panel of claim 1, further comprising:
the cells forming structural units comprising masses subject to vibratory motion and the vibratory motion has resonant frequencies that increases or decreases by varying the lateral dimensions of the structural units, the membrane elasticity and wrinkle patterns, and the material type and dimension of the platelets, thereby permitting selection of the resonant frequency as a lossy core.

12. An acoustic/vibrational energy absorption metamaterial comprising:
   an enclosed planar frame;
   a flexible membrane attached to said frame;
   at least one rigid platelet attached to said flexible membrane, the rigid platelet having an asymmetric shape, with a substantially straight edge at the attachment to said flexible membrane, the rigid platelet establishing a cell comprising a predetermined mass;
   the rigid platelet mounted to provide a restoring force exerting by the flexible membrane upon displacement of the rigid platelet; and
   the cells comprising rigid platelets, wherein the rigid platelets have a flapping mode providing a tunable function,
   wherein vibrational motions of the structure contain plural resonant modes with tunable resonant frequencies.

13. The acoustic/vibrational energy absorption metamaterial of claim 12, further comprising a plurality of platelets in each unit cell.

14. The acoustic/vibrational energy absorption metamaterial of claim 13, wherein adjacent frames face each other with a distance having a predetermined relationship to the size of said frames.

15. The acoustic/vibrational energy absorption metamaterial of claim 13, wherein the flapping mode provides the tunable function whereby the frequency decreases in an approximate relationship to the inverse square root of the mass of platelets.

16. The acoustic/vibrational energy absorption metamaterial of claim 13, wherein the flapping mode provides the tunable function based on the tunable resonant frequencies, said resonant frequencies tunable by varying the distance of separation between asymmetric platelets, or the thickness and elasticity of the membrane, the mass of the platelets, and the cell dimension.

17. The acoustic/vibrational energy absorption metamaterial of claim 16, further comprising providing the tunable function by varying at least one of the Young's module and the Poisson ratio of the membrane.

18. The acoustic/vibrational energy absorption metamaterial of claim 13, wherein the structural units comprise masses subject to vibratory motion and the vibratory motion has resonant frequencies that increases or decreases by varying the lateral dimensions of the structural units, a distance of separation between adjacent ones of the masses, the membrane thickness and elasticity, and the material type and dimension of the platelets, thereby permitting selection of the resonant frequency as a lossy core.

19. An acoustic/vibrational energy absorption metamaterial comprising:
   a substantially acoustically transparent planar, rigid frame divided into a plurality of individual, substantially two-dimensional cells;
   a sheet of a flexible material fixed to the rigid frame, and a plurality of platelets fixed to the sheet of flexible material such that each cell is provided with a plurality of platelets, thereby establishing a resonant frequency, the resonant frequency defined by the planar geometry of the respective individual cells, the flexibility of the flexible material and said respective platelet thereon and establishing an increase in an absorption coefficient of the panel;
   the flexible material having a wrinkle or corrugation to permit distortion with reduced material elasticity, thereby permitting the flexible material to distort beyond that afforded by a planar material of the same type, while retaining mechanical strength in supporting the plurality of platelets; and
   at least one aluminum reflector at a predetermined near-field distance behind the membrane, the aluminum reflector improving sound absorption.

20. The acoustic/vibrational energy absorption metamaterial of claim 12, wherein
   the vibrational motions of the structure contain a number of resonant modes with tunable resonant frequencies while using a frictional hinge attachment biased toward a neutral position to absorb the vibration energy by replacing energy from movement of the rigid platelets by rotational torque and its amplified force density inside the hinge.

21. An acoustic/vibrational energy absorption metamaterial comprising:
   an enclosed planar frame;
   an flexible membrane attached to said frame;
   at least one rigid platelet attached to said flexible membrane with a frictional hinge attachment;
   the rigid platelet having an asymmetric shape, with a substantially straight edge at the attachment to said flexible membrane, the rigid platelet establishing a cell comprising a predetermined mass;
   the rigid platelet mounted to provide a restoring force exerting by the flexible membrane upon displacement of the rigid platelet; and
   at least one aluminum reflector at a predetermined near-field distance behind the membrane,
   wherein vibrational motions of the structure comprise plural resonant modes with tunable resonant frequencies, the vibrational motions of the structure containing a number of resonant modes with tunable resonant frequencies while using the frictional hinge attachment to absorb the vibration energy by replacing energy from movement of the rigid platelets by rotational torque and its amplified force density inside the hinge.

22. The acoustic/vibrational energy absorption metamaterial of claim 21, further comprising a plurality of rigid platelets in each unit cell,
   wherein the rigid platelets have a flapping mode providing a tunable function based on the tunable resonant frequencies, said resonant frequencies tunable by varying the distance of separation between asymmetric platelets, or the thickness and elasticity of the membrane, the mass and dimension of the platelets, and the cell dimension.

23. The acoustic/vibrational energy absorption metamaterial of claim 22, further comprising providing the tunable function by varying at least one of the Young's module and the Poisson ratio of the membrane.

24. The acoustic/vibrational energy absorption metamaterial of claim 22,
   wherein the rigid platelets have a flapping mode providing a tunable function whereby the frequency decreases in an approximate relationship to the inverse square root of the mass of platelets.

25. The acoustic/vibrational energy absorption metamaterial of claim 21, further comprising a plurality of rigid platelets in each unit cell,
   wherein the structural units comprise masses subject to vibratory motion and the vibratory motion has resonant frequencies that increases or decreases by varying the lateral dimensions of the structural units, the membrane thickness and elasticity, and the material type and dimension of the platelets, thereby permitting selection of the resonant frequency as a lossy core.

26. An acoustic/vibrational energy absorption metamaterial comprising:
- a substantially acoustically transparent planar, rigid frame divided into a plurality of individual, substantially two-dimensional cells;
- a sheet of a flexible material fixed to the rigid frame, and a plurality of platelets fixed to the sheet of flexible material such that each cell is provided with a respective platelet, thereby establishing a resonant frequency, the resonant frequency defined by the planar geometry of the respective individual cells, the flexibility of the flexible material and said respective platelet thereon and establishing an increase in an absorption coefficient of the panel;
- the flexible material having a wrinkle or corrugation to permit distortion with reduced material elasticity, thereby permitting the flexible material to distort beyond that afforded by a planar material of the same type, while retaining mechanical strength in supporting the plurality of platelets; and
- at least one aluminum reflector at a predetermined near-field distance behind the membrane, the aluminum reflector improving sound absorption.

* * * * *